(No Model.)
J. W. SIMS.
GATE.
No. 319,333. Patented June 2, 1885.
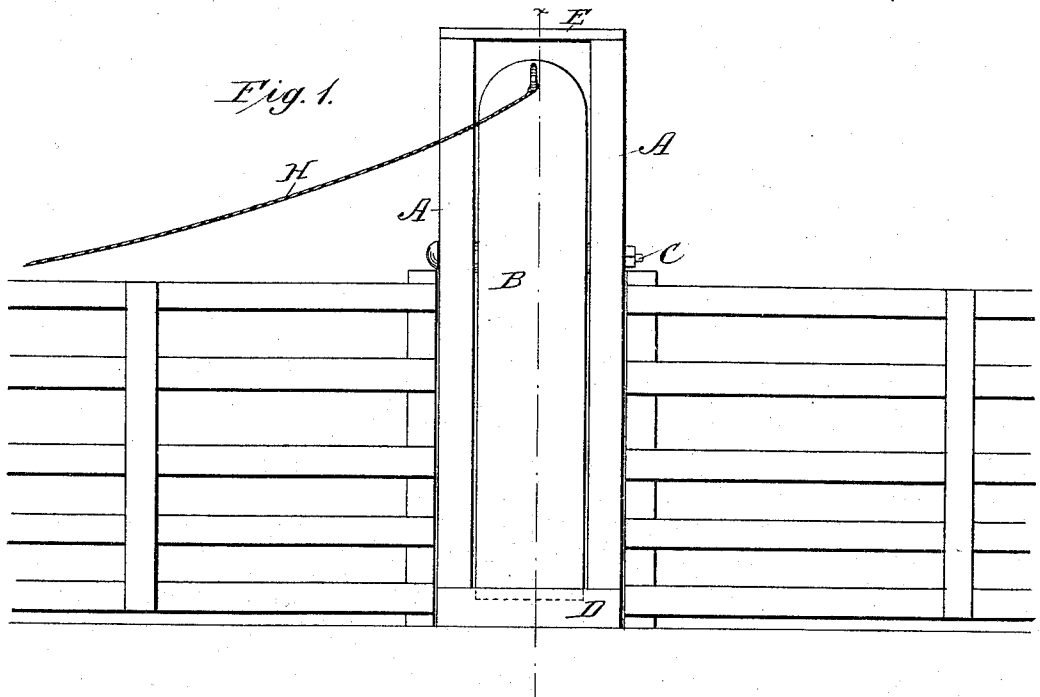
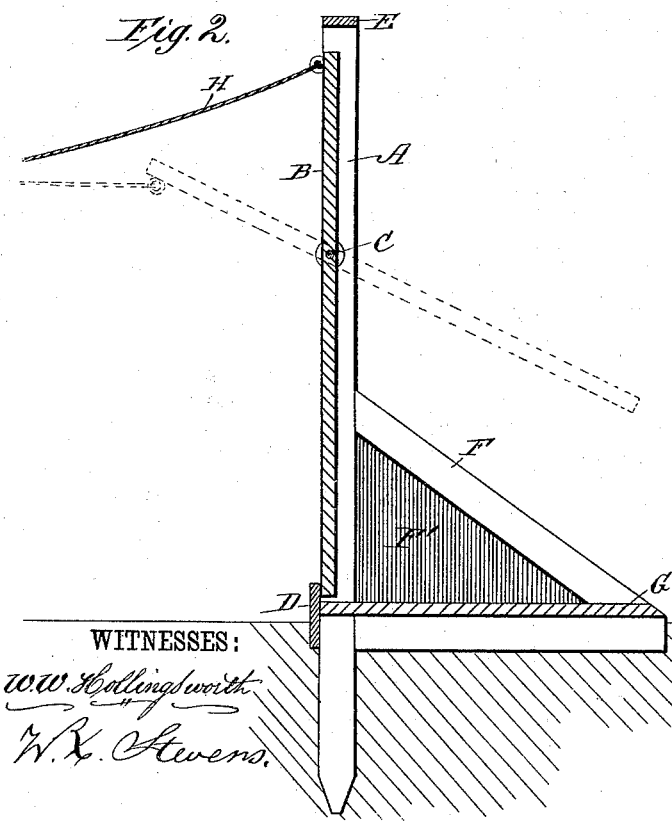
WITNESSES:
W. W. Hollingsworth
W. X. Stevens
INVENTOR:
Jno. W. Sims
BY Munn & Co
ATTORNEYS.

UNITED STATES PATENT OFFICE.

JOHN WASHINGTON SIMS, OF JAMESTOWN, ARKANSAS.

GATE.

SPECIFICATION forming part of Letters Patent No. 319,333, dated June 2, 1885.

Application filed June 13, 1884. (No model.)

*To all whom it may concern:*

Be it known that I, JOHN WASHINGTON SIMS, a citizen of the United States, residing at Jamestown, in the county of Independence and State of Arkansas, have invented certain new and useful Improvements in Gates, of which the following is a description.

This invention relates to that class of gates which are used to stop the passage of animals; and it has for its object to stop the passage of hogs going one way, while it permits them to go the other way through.

To this end my invention consists in the construction and combination of parts forming a gate, hereinafter described and claimed, reference being had to the accompanying drawings, in which—

Figure 1 is a front elevation of my gate, and Fig. 2 is a vertical section transverse to the gate-body.

A represents two side posts, which may be fixed in the ground at their lower ends. These posts should be only far enough apart to permit one hog to pass between them at a time.

B is the gate, hung to the posts upon a horizontal axis, C, which axis is above the center of gravity of the gate, in order that the gate may close of its own weight.

D is the sill or threshold, lying across the path of the gate to prevent the latter from swinging past a vertical position. This sill may be secured at its ends to the posts A.

E is a lintel or cap secured to the tops of the posts to keep them in their proper relative positions.

F are side braces connecting the posts with the floor G, and provided with side boards, F', all secured firmly together to make the gate a complete portable article, easily raised and moved as a whole to any place desired. The gate will be set to open in the direction desired.

H represents a cord, by means of which the gate may be opened and held open by a person at a distance to let timid or wild hogs come in. This cord may be passed over pulleys or around corners to reach the desired point of use, and it may be provided with a weight, if necessary, to hold the gate open.

The operation is as follows: Suppose the gate is in the fence of a feeding-pen, hung to swing outward; then it will prevent any hog from entering until the gate is properly raised, and when the farmer sees a neighbor's hog coming in to feed with his hogs he may close the gate and drive the hog away. When all in, the hogs may be left to feed at their leisure, uninterrupted by cattle or geese, and when they are done feeding they may push open the gate and pass out to roam.

What I claim as my invention, and desire to secure by Letters Patent, is—

The combination, in a portable self-closing gate, of a pair of posts, A, a floor, G, secured thereto at some distance above their lower ends, a pair of braces, F, connecting the floor with the posts, a pair of side boards, F', beneath the braces, a threshold, D, and a lintel joining the posts, a gate, B, pivoted above its center of gravity between the posts, and a rope, H, attached to the gate, the posts A extending below the floor, substantially as shown and described, whereby the gate may be readily secured to the ground, or it may be removed bodily from place to place, for the purpose specified.

JOHN WASHINGTON SIMS.

Witnesses:
MOSBY C. WEAVER,
CIMNATI M. COLLINS.